United States Patent
Lee et al.

(10) Patent No.: US 6,514,205 B1
(45) Date of Patent: Feb. 4, 2003

(54) MEDICAL DIGITAL ULTRASONIC IMAGING APPARATUS CAPABLE OF STORING AND REUSING RADIO-FREQUENCY (RF) ULTRASOUND PULSE ECHOES

(75) Inventors: Min Hwa Lee, Seoul (KR); Tai Kyong Song, Punchun (KR)

(73) Assignee: Medison Co., Ltd., Kangwon-do (KR)

( * ) Notice: Subject to any disclaimer, the term of this patent is extended or adjusted under 35 U.S.C. 154(b) by 0 days.

(21) Appl. No.: 09/500,206

(22) Filed: Feb. 8, 2000

(30) Foreign Application Priority Data

Feb. 9, 1999 (KR) .............................................. 99-4474

(51) Int. Cl.[7] ................................................. A61B 8/00
(52) U.S. Cl. ........................ 600/443; 600/447; 367/138
(58) Field of Search ................................. 600/443, 437, 600/447, 453, 448, 462, 463, 455; 137/247.19; 348/163; 367/138; 333/165

(56) References Cited

U.S. PATENT DOCUMENTS

| | | | | |
|---|---|---|---|---|
| 5,675,554 A | * | 10/1997 | Cole et al. | 367/138 |
| 5,795,297 A | * | 8/1998 | Daigle | 600/447 |
| 6,248,073 B1 | * | 6/2001 | Gilbert et al. | 600/447 |

* cited by examiner

*Primary Examiner*—Marvin M. Lateef
*Assistant Examiner*—Ruby Jain
(74) *Attorney, Agent, or Firm*—F. Chau Associates, LLP (57) ABSTRACT

A storing method of a RF ultrasound pulse echo and a medical digital ultrasonic imaging apparatus capable of re-using the stored RF ultrasound pulse echo store and focus each RF ultrasound pulse echo received from a plurality of transducer elements in order to implement an ultrasonic image of at least one frame. Then, the stored RF ultrasound pulse echoes are analyzed, to thereby control the system according to the analysis result, which results in implementation of an optimal ultrasonic image.

20 Claims, 8 Drawing Sheets

MEDICAL DIGITAL ULTRASONIC IMAGING APPARATUS CAPABLE OF STORING AND REUSING RADIO-FREQUENCY (RF) ULTRASOUND PULSE ECHOES

BACKGROUND OF THE INVENTION

1. Field of the Invention

The present invention relates to a medical digital ultrasonic imaging apparatus capable of storing and reusing the RF ultrasound pulse echoes, in which each RF ultrasound pulse echo received from a plurality of transducer elements is stored in order to implement an ultrasonic image of at least one frame, and the stored data are signal-analyzed, to thereby control the system according to the analysis result so that an optimal ultrasonic image can be implemented.

2. Description of the Related Art

Figure 1:
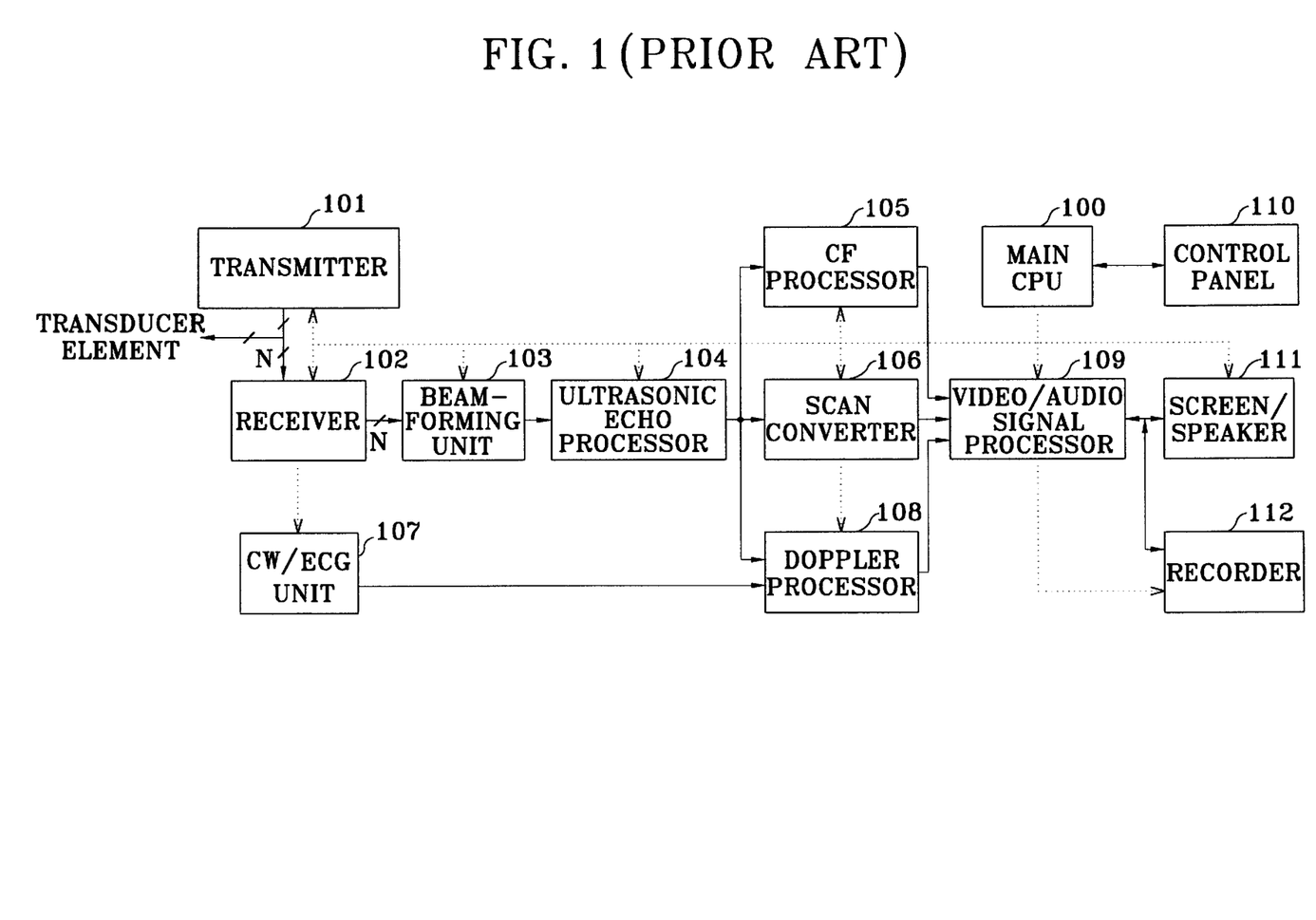
FIG. 1 is a block diagram showing a configuration of a general medical digital ultrasonic imaging apparatus.

FIG. 1 is a block diagram showing a configuration of a general medical digital ultrasonic imaging apparatus.

In FIG. 1, a main central processing unit (CPU) 100 controls the entire ultrasonic imaging apparatus according to user's instruction via a control panel 110. A transmitter 101 applies a transmission pulse to N elements of an array transducer. A receiver 102 receives a RF ultrasound pulse echo (referred to a RF signal) reflected and returned from an object to each transducer element. The receiver 102 consists of a pre-amplifier, a time gain compensation (TGC) amplifier, and a filter for each array element. A beamforming unit 103 performs a dynamic focusing of the receiver 102 outputs with respect to all image points thereof in order to improve a resolution of an ultrasonic image. An ultrasonic echo processor 104 receives the focused signal and performs a series of a signal processing operations in order to obtain various modalities of ultrasonic images. A color flow (CF) processor 105 and a scan converter 106 receive the signal output from the ultrasonic echo processor 104 and implement a two-dimensional CF image and a B-mode image, respectively. A Doppler processor 108 receives the signal output from the ultrasonic echo processor 104 and a continuous wave/ElectroCadioGram (CW/ECG) unit 107 and implements a spectral Doppler waveform. An video/audio signal processor 109 processes the video/audio signal outputs from the CF processor 105, the scan converter 106 and the Doppler processor 108 and the results are output to a screen/speaker 111 or a recorder 112 for recording. Also, the video signal and the audio signal which have been recorded on the recorder 112 are output to the screen/speaker 111 as needed by a user.

Figure 2:
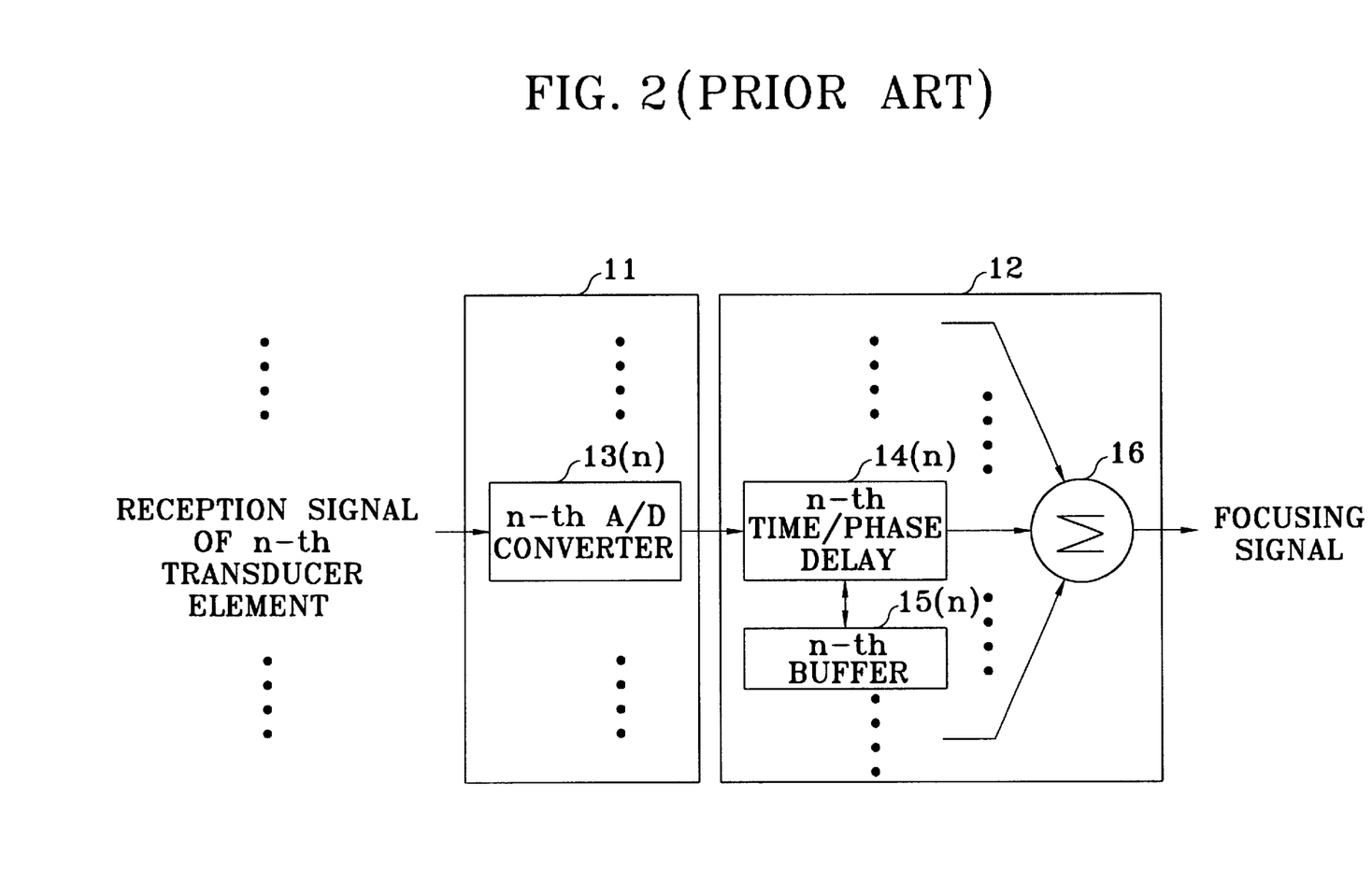
FIG. 2 shows the configuration of the beamforming unit of FIG. 1.

FIG. 2 is a detailed block diagram showing the configuration of the beamforming unit 103 of FIG. 1.

The beamforming unit 103 of FIG. 2 includes an analog-to-digital (A/D) converter 11 which samples the received RF signals for N tranducer elements and a beamformer 12 for focusing the A/D converter 11 outputs and outputting the focused result.

The A/D converter 11 is comprised of a plurality of A/D converters 13. Here, nth A/D converter 13($n$) receives the RF signal received at nth transducer element among the N transducer elements from a receiver which is not shown in FIG. 2 and samples the received RF signal.

The beamformer 12 includes a plurality of time/phase delay unit 14, a plurality of buffers 15 and an a summer 16. Here, the nth time/phase delay unit 14($n$) receives the data output from the nth A/D converter 13($n$) and stores the received data temporarily in the nth buffer 15($n$) of small capacity. A first-in-first-out (FIFO) memory or a two-port memory is used as a buffer. The data output from each A/D converter is sequentially stored in each corresponding buffer. Thus, each buffer is capable of storing data necessary for time delay or phase delay.

When all data for focusing the RF signal at a desired image point are input to the nth buffer 15($n$), the nth time/phase delay unit 14($n$) impose the focusing delays on the data stored in the corresponding nth buffer 15($n$). The time and/or phase-delayed data are summed by an adder 16 to finish the focusing process.

The data output from each A/D converter 13, which are stored in each buffer 15 are continuously changed since the focusing delay for each element changes with a depth. Generally, the data output from each A/D converter 13 and stored in each buffer 15 disappears if a focusing process is completed, and thus cannot be re-used. Also, an accurate focusing of the RF signals received from a plurality of the transducer elements is not accomplished due to the waveform distortion that occurs due to various physical phenomena as the ultrasound travels in an object. Thus, in most cases, it is not possible to actually obtain an ultrasonic image with the best resolution that can be achieved theoretically.

SUMMARY OF THE INVENTION

To solve the above problems, it is an object of the present invention to provide a method for storing each RF ultrasound pulse echo received from a plurality of transducer elements in order to implement an ultrasonic image of at least one frame.

It is another object of the present invention to provide a medical digital ultrasonic imaging apparatus that can analyze and reuse the stored RF ultrasound pulse echoes to further enhance the ultrasonic image.

To accomplish the above object of the present invention, there is provided a storing method for using RF ultrasound pulse echoes received from a plurality of transducer elements in a digital ultrasonic imaging system, the storing method comprising the steps of: (a) sampling each RF ultrasound pulse echo; and (b) storing the sampled data for implementing an ultrasonic image of at least one frame.

There is also provided a medical digital ultrasonic imaging apparatus for focusing each RF ultrasound pulse echo received from a plurality of transducer elements and implementing an ultrasonic image, the medical digital ultrasonic imaging apparatus comprising: a receiver for converting each RF ultrasound pulse echo into an electrical signal and outputting the converted result; beamforming unit for sampling each of the RF ultrasound pulse echoes output from the receiver, storing the sampled data for implementing an ultrasonic image of at least one frame, focusing the sampled data or the stored sampled data and outputting the focused result; a signal processor for receiving the focused signal from the beamforming unit and performing a series of signal processing for implementing the ultrasonic image; and a controller for controlling the entire apparatus.

BRIEF DESCRIPTION OF THE DRAWINGS

The above objects and other advantages of the present invention will become more apparent by describing the preferred embodiments thereof in more detail with reference to the accompanying drawings in which.

DETAILED DESCRIPTION OF THE PREFERRED EMBODIMENTS

A preferred embodiment of the present invention will be described with reference to the accompanying drawings.

Figure 3:
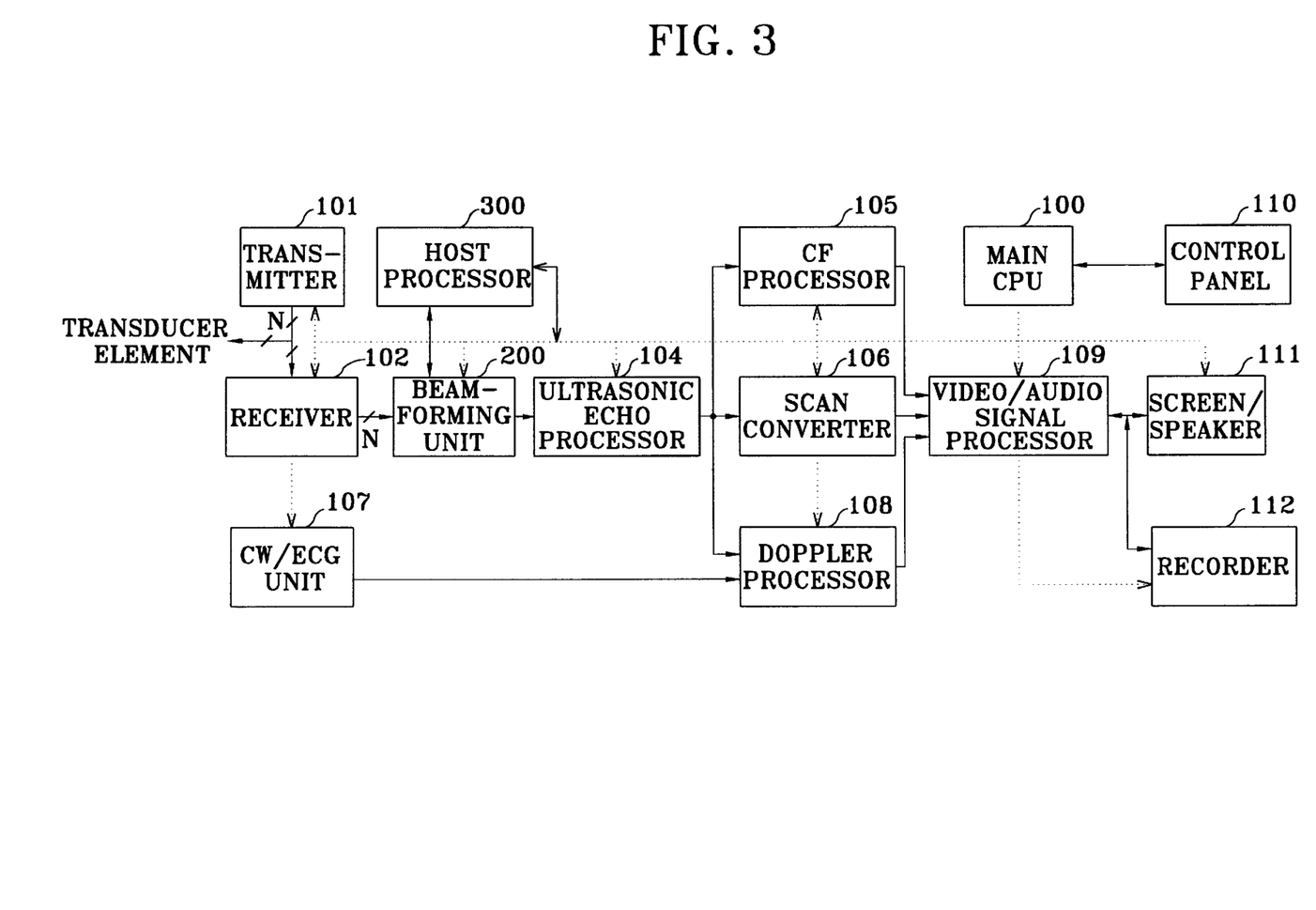
FIG. 3 is a block diagram showing a configuration of a medical digital ultrasonic imaging apparatus according to the present invention.

FIG. 3 is a block diagram showing a configuration of a medical digital ultrasonic imaging apparatus according to the present invention.

An ultrasonic imaging apparatus of FIG. 3 is assigned with the same reference numbers as those of FIG. 1 with respect to the components which perform the same functions as those of FIG. 1. Accordingly, the detailed description thereof will be omitted.

In the ultrasonic imaging apparatus of FIG. 3, a beamforming unit 200 samples the data (that is, the RF ultrasound pulse echo, referred to the RF signal) fed from a receiver 102 under the control of a host processor 300 and stores and focuses the sampled data. The beamforming unit 200 and the host processor 300 transmit data to each other. The host processor 300 analyzes the stored sampled data received from the beamforming unit 200 and controls each component of the ultrasonic imaging apparatus through an external interface bus denoted as a dotted line according to the result of the signal analysis, together with a main central processing unit (CPU) 100.

The configuration and operation of the beamforming unit 200 according to the present invention will be described in more detail with reference to FIGS. 4 through 8.

Figure 4:
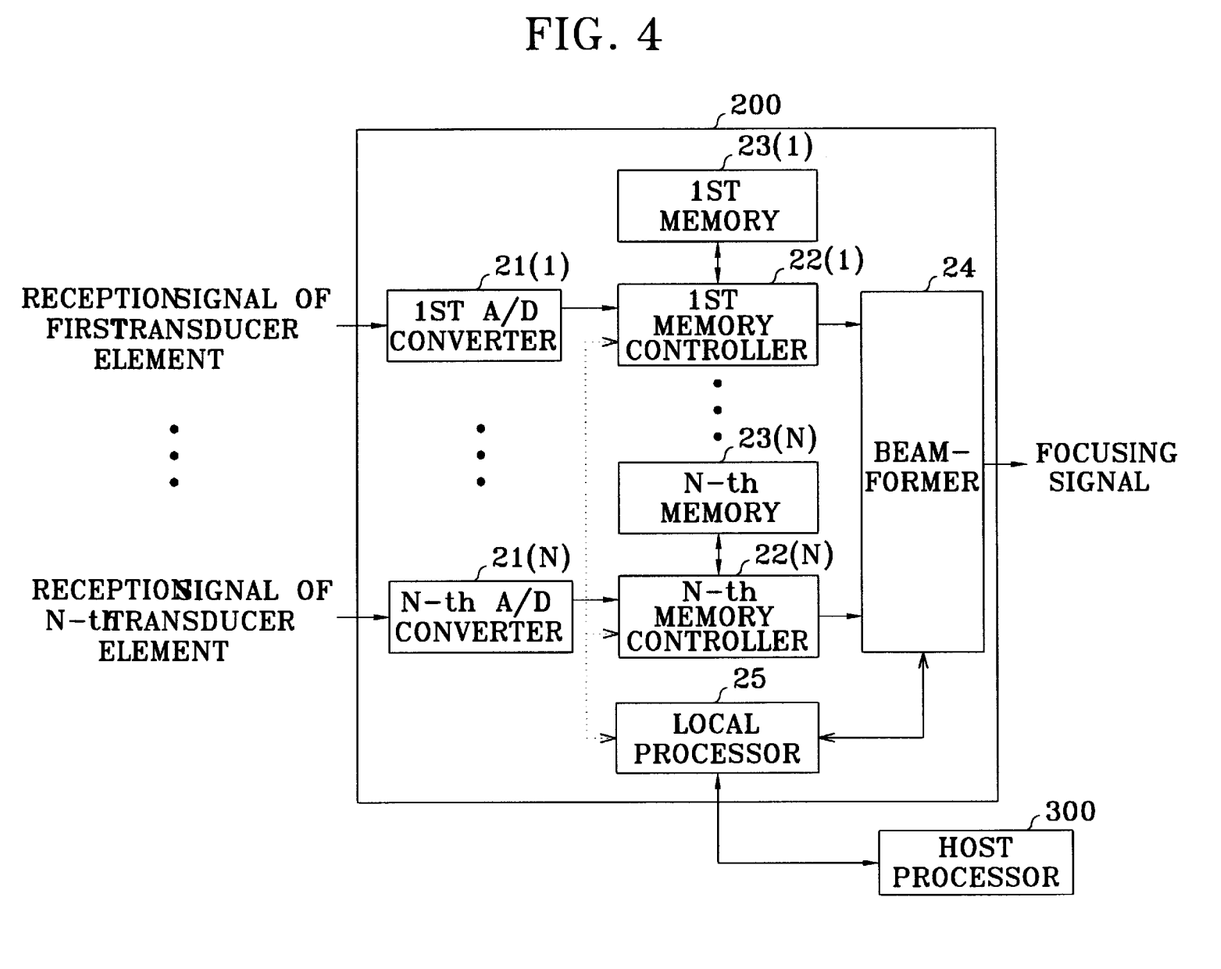
FIG. 4 is a block diagram showing a connection between the beam forming unit of FIG. 3 and a host processor located outside the beamforming unit.

FIG. 4 is a block diagram showing a connection between the beam forming unit 200 according to the present invention and a host processor 300 located outside the beamforming unit 200.

The beamforming unit 200 of FIG. 4 includes A/D converters 21(1) through 21(N) which sample the RF signals received at N transducer elements and output the sampled data. Memory controllers 22(1) through 22(N) for transmitting data from the A/D converters 21(1) through 21(N) to various units are connected to respective output ends of the A/D converters 21(1) through 21(N). The memories 23(1) through 23(N) for receiving data from the memory controllers 22(1) through 22(N), storing data for implementing an ultrasonic image of at least one frame, and transmitting the stored data to the respective memory controller 22(1) through 22(N) are connected to the respective output ends of the memory controllers 22(1) through 22(N). A beamformer 24 for receiving data from the memory controllers 22(1) through 22(N), focusing the received data and outputting the focused result is connected to the output end of the memory controllers 22(1) through 22(N). A local processor 25 connected to the output end of the memory controllers 22 through 22(N) controls the memory controllers 22 through 22(N) and the beamformer 24, can receive or send data from or to the memory controller 22(1) through 22(N) and the beamformer 24, carries out signal analysis of the data stored in the memories 23(1) through 23(N), and controls the beamformer 24 according to the analysis result. As described above, the beamforming unit 200 includes the A/D converters 21(1) through 21(N), the memory controllers 22(1) through 22(N), the memories 23(1) through 23(N), the beamformer 24 and the local processor 25.

The memories 23(1) through 23(N) for receiving data from the memory controllers 22(1) through 22(N), storing data for implementing an ultrasonic image of at least one frame, and transmitting the stored data to the respective memory controller 22(1) through 22(N) are connected to the respective output ends of the memory controllers 22(1) through 22(N). A beamformer 24 for receiving data from the memory controllers 22(1) through 22(N), focusing the received data and outputting the focused result is connected to the output end of the memory controllers 22(1) through 22(N). A local processor 25 connected to the output end of the memory controllers 22(1) through 22(N) controls the memory controllers 22(1) through 22(N) and the beamformer 24, can receive or send data from or to the memory controller 22(1) through 22(N) and the beamformer 24, carries out signal analysis of the data stored in the memories 23(1) through 23(N), controls the beam former 24 according to the analysis result. As described above, the beamforming unit 200 includes the A/D converters 21 (1) through 21 (N), the memory controllers 22(1) through 22(N), the memories 23(1) through 23(N), the beamformer 24 and the local processor 25.

The local processor 25 in the beamforming unit 200 can be connected to each memory controller 22(1) through 22(N) one by one as many as N local processors can be used in the beamforming unit 200, that is, one for each memory controller 22, according to the specification of the medical digital ultrasonic imaging apparatus to be designed. The host processor 300 is a single or parallel processor system which can perform a signal and image processing at a very high speed and can be replaced by a main CPU 100 according to the design specification.

The operations of the beamforming unit 200 and the host processor 300 having the above configuration will be described.

The A/D converters 21(1) through 21(N) in the beamforming unit 200 receive the RF signals received at N transducer elements through a receiver (not shown in FIG. 4) of FIG. 3 and perform a sampling of the received RF signals. The A/D converters 21(1) through 21(N) output the sampled data to each of the corresponding memory controllers 22(1) through 22(N). The memory controllers 22(1) through 22(N) transmit the sampled data applied from the A/D converters 21(1) through 21(N) to each of the corresponding memories 23(1) through 23(N) and the beamformer 24, which is controlled by the local processor 25. Each of the memories 23(1) through 23(N) stores the sampled data for each scan line in a separate location. The beamformer 24 focuses the sampled data for each scan line and outputs the result. By doing so, the data applied to the beamforming unit 200 is sampled and stored in the memories 23(1) through 23(N) and focused in the beamformer 24. The specific configuration of the memory controllers 22(1) through 22(N) and the memories 23(1) through 23(N) will be described later with reference to FIGS. 5 and 6.

The memory controllers 22(1) through 22(N) read the data stored in each of the corresponding memories 23(1) through 23(N) under the control of the local processor 25. The memory controllers 22(1) through 22(N) transmit the read data to the beamformer 24 and the local processor 25. The local processor 25 performs a signal analysis of the data and estimates an ultrasonic velocity profile, variation of the frequency spectrum of the ultrasonic pulse echo with depth and noise characteristics, etc. which are required for focusing and forming the ultrasonic image. The local processor 25 controls the beamformer 24 according to the analysis result so that an optimal ultrasonic image can be obtained. The beamformer 24 focuses the applied data under the control of the local processor 25, and thus an ultrasonic image having an improved resolution, signal-to-noise ratio, etc. is obtained.

The local processor 25 can transmit the data sent from the memory controllers 22(1) through 22(N) to the host processor 300. The host processor 300 can also perform the signal analysis of the data from the local processor 25 and can control the ultrasonic imaging apparatus according to the analysis result.

The data analysis and system control can be properly distributed between the local processor 25 and the host processor 300.

Figure 5:
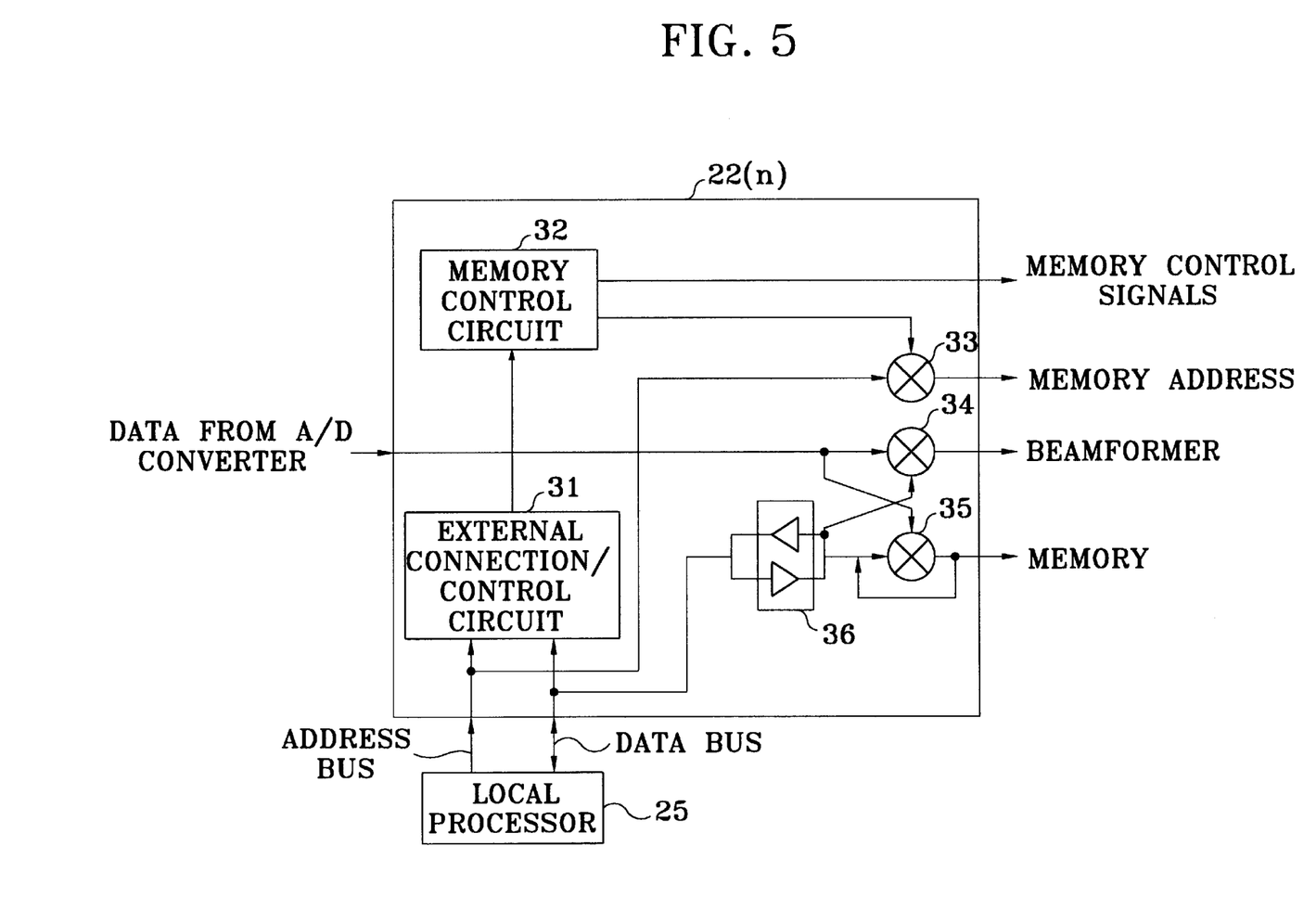
FIG. 5 shows a configuration of a memory controller of FIG. 4.

FIG. 5 shows a configuration of a memory controller 22(n) of FIG. 4.

In FIG. 5, an external connection/control circuit 31 in the memory controller 22(n) controls the entire components of the memory controller 22(n) under the control of the local processor 25. A memory control circuit 32 generates memory control signals for reading and writing data from and to memory 23(n), and generates a memory address through a multiplexer 33.

The memory controller 22(n) transmits the data from the A/D converter 21(n) to the beamformer 24 via a mutliplexer 34, or to the memory 23(n) via a multiplexer 35. Also, the memory controller 22(n) reads the data stored in the memory 23(n) and transmits the read data to the local processor 25 via a buffer 36 or to the beamformer 24 via a mutliplexer 34. The memory controller 22(n) transmits the data from the local processor 25 to the beamformer 24 via the buffer 36 and the multiplexer 34, or to the memory 23(n) via the buffer 36 and the multiplexer 35.

Figure 6:
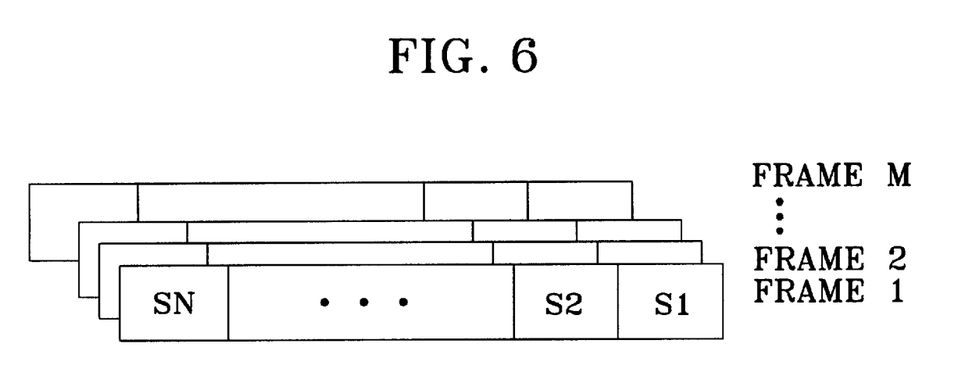
FIG. 6 shows an example of the structure of a memory of FIG. 4.

FIG. 6 shows an example of the structure of a memory 23(n) of FIG. 4, which is the same for all n.

A semiconductor memory device or a hard disc storage device can be used as the memory 23(n). The memory 23(n) stores the sampled data necessary for implementing an ultrasonic image of at least one frame among the output data of the corresponding A/D converter 21(n). Also, the memory 23(n) receives the data from the local processor 25 via the corresponding memory controller 22 and stores the received data.

As shown in FIG. 6, if N scan lines are needed to implement an ultrasonic image of one frame, the memory 23(n) stores in turn data with respect to each scan line in S1, S2, . . . , SN, respectively. Also, the memory 23(n) stores all the data capable of implementing an ultrasonic image of M frames.

As described above, in the case that each transducer element corresponds to each one of the A/D converters 21(1) through 21(N), each of the A/D converters 21(1) through 21(N) performs a uniform sampling at the same instance of time, and the beamformer 24 focuses input data according to the delay-and-sum method, each capacity of the memories 23(1) through 23(N) is expressed as the following equation.

Memory capacity=$N_{fr} \times N_{sl} \times (F_s \times 2 \times Z_{max}/c)$

Here, $N_{fr}$ is the number of frames to be stored in memory, $N_{sl}$ is the number of scan lines to be stored every frame, $F_s$ is an A/D conversion rate or a sampling frequency, $Z_{max}$ is a maximum image depth, and c is an ultrasonic velocity in an object.

Since the beamforming unit 200 according to the present invention stores and focuses the data sampled by the A/D converters 21(1) through 21(N), the ultrasonic imaging apparatus can re-use the data stored in the beamforming unit 200 subsequently.

For example, in the case that one desires to obtain an zoomed image of a selected region of an ultrasonic image during real-time imaging or after temporarily freezing the imaging, a conventional ultrasonic imaging apparatus displays simply an enlarged image.

However, since the ultrasonic imaging apparatus according to the present invention stores all the RF signals to form a complete image frame or more, the zoomed image of the selected region with increased scan lines and imaging points by the factor of the zooming ratio can be formed by using the stored RF samples. That is, the ultrasonic imaging apparatus according to the present invention obtains an image having an enhanced quality compared to the conventional art, because it can utilize the stored data in order to reconstruct an ultrasonic image.

Also, the ultrasonic imaging apparatus according to the present invention can perform a synthetic focusing, a two-way dynamic focusing, and a multiple beam focusing, using the data stored in the beamforming unit.

Figure 7:
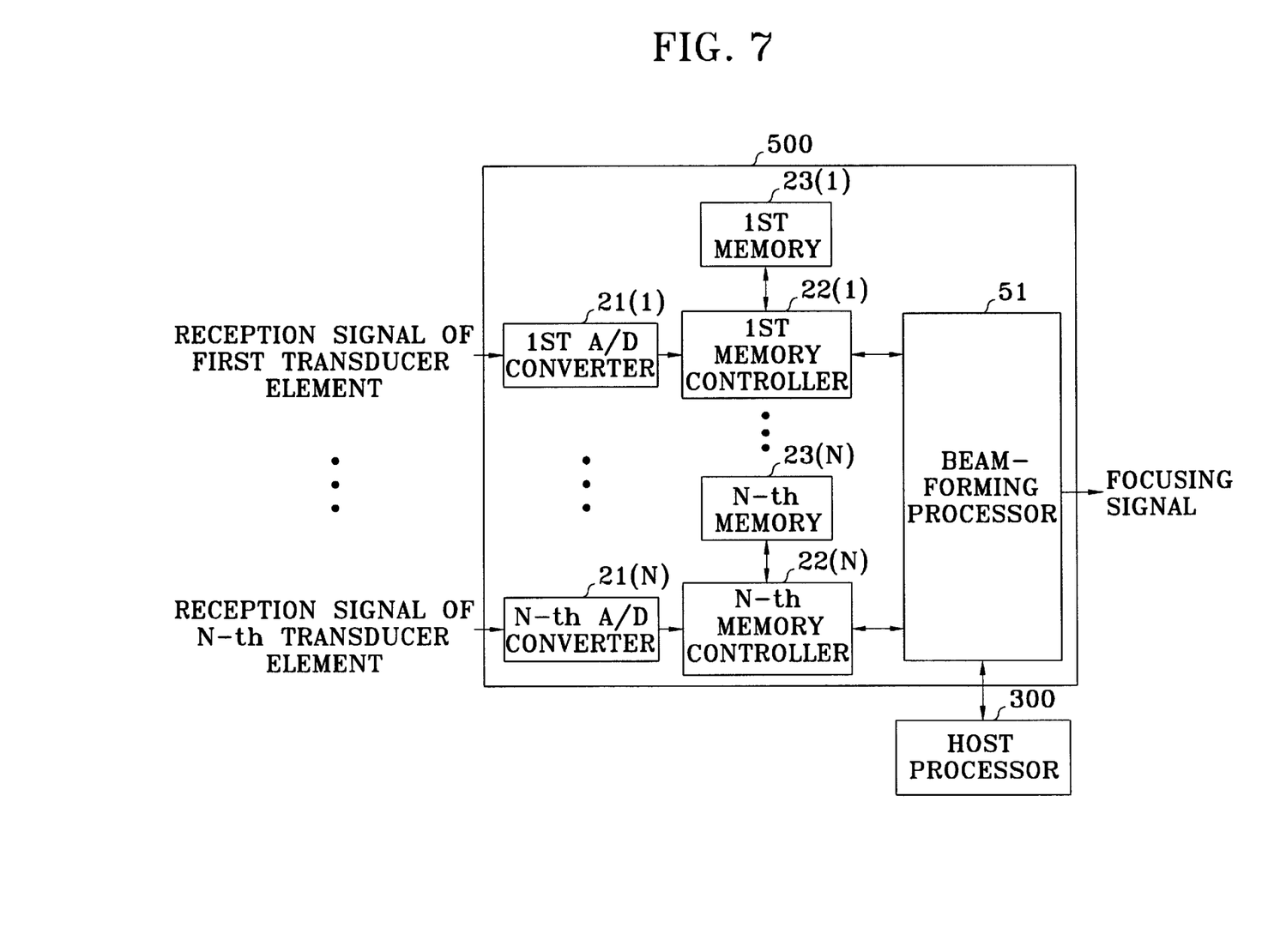
FIG. 7 is a block diagram showing a connection between the beam forming unit according to an alternative embodiment of FIG. 3 and a host processor located outside the beamforming unit.

FIG. 7 is a block diagram showing a connection between the beamforming unit 500 according to an alternative embodiment of the present invention and a host processor 300 located outside the beamforming unit.

The beamforming unit 500 of FIG. 7 includes a beamforming processor 51 in the form of a combination of the beamformer 24 and the local processor 25 in the beamforming unit 200 of FIG. 4, or in the form of a high-speed microprocessor. Thus, since the beam forming processor 51 performs the same functions as those of the beamformer 24 and the local processor 25, the detailed description thereof will be omitted. Since the other functional blocks in the beamforming unit 500 have the same functions and connections as those in the beamforming unit 200 of FIG. 4, they are assigned the same reference numbers as those of FIG. 4 and the detailed description thereof will be omitted.

The host processor 300 shown in FIG. 7 is connected to the beam forming processor 51 and performs the same function as that of the host processor 300 shown in FIG. 4. The detailed description of the host processor 300 will be omitted.

Figure 8:
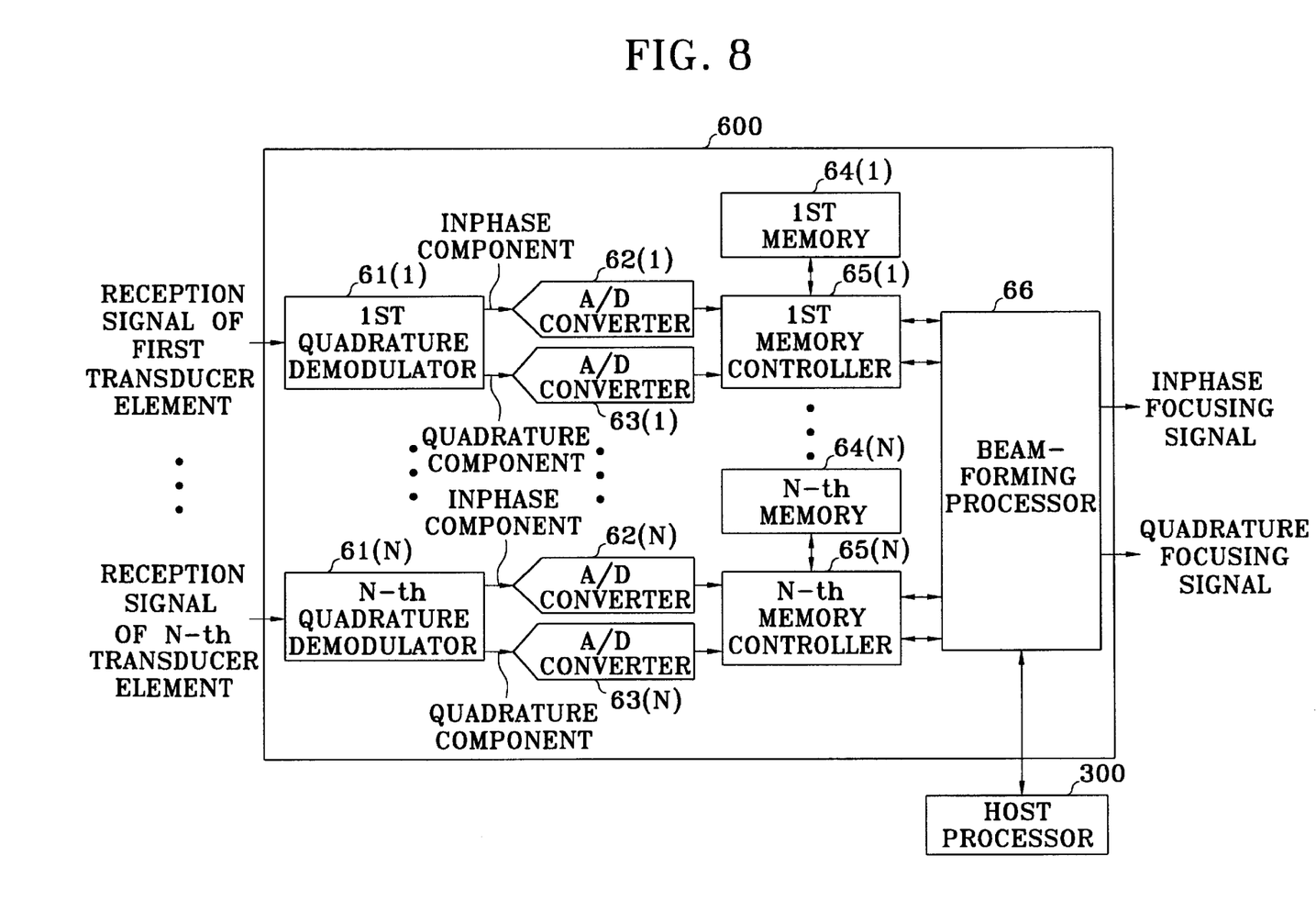
FIG. 8 is a block diagram showing a connection between the beam forming unit according to another different embodiment of FIG. 3 and a host processor located outside the beamforming unit.

FIG. 8 is a block diagram showing a connection between a beamforming unit 600 according to a different embodiment of the beamforming unit 200 shown in FIG. 3 and a host processor 300 located outside the beamforming unit.

Quadrature demodulators 61(1) through 61(N) in the beamforming unit 600 of FIG. 8 receive the RF signals received at N transducer elements respectively, from the receiver of FIG. 3 which is not shown in FIG. 8 and produce in-phase and quadrature components and output the results. A/D converters 62(1) through 62(N) receive the in-phase components from the quadrature demodulators 61 (1) through 61 (N) and sample the received signals and output the in-phase samples to memory controllers 65(1) through 65(N). A/D converters 63(1) through 63(N) received the quadrature components from the quadrature demodulators 61(1) through 61(N) and sample the received signals and output the quadrature samples to memory controllers 65(1) through 65(N). The memory controllers 65(1) through 65(N) output the data received from the respective A/D converters 62(1) through 62(N) and 63(1) through 63(N) to each of the corresponding memories 64(1) through 64(N) and the beamforming processor 66. The memories 64(1) through 64(N) have the same functions and structures as those of memories 23(1) through 23(N) of FIGS. 4 and 7.

The beamforming processor 66 controls data transmission paths of the memory controller 65(1) through 65(N). The beam forming processor 66 can perform mutual data transmission with the memory controllers 65(1) through 65(N), and analyzes the data, and focuses the data from the memory controllers 65(1) through 65(N), and then output the focused result. In this manner, since the beam forming processor 66 analyzes the data applied from the memory controllers 65(1) through 65(N) and focuses the data based on the analysis result, an enhanced ultrasonic image can be obtained. That is, the beamforming processor 66 performs both the functions of the beamformer 24 and the local processor 25 in the beamforming unit 200 of FIG. 4. Thus, the beamforming processor 66 can be replaced by a functional block having a function of the beamformer 24 and a functional block having a function of the local processor 25.

Further, the beamforming processor 66 is under the control of the host processor 300 which is connected to the beamforming unit 600 externally.

The host processor 300 shown in FIG. 8 performs the same function as those of the host processors 300 shown in FIGS. 4 and 7. Thus, the detailed description of the host processor 300 will be omitted.

As described above, the method for storing the RF signals and the medical digital ultrasonic imaging apparatus can store the RF signals to form an ultrasonic image of at least one frame. It is also possible to re-use the stored data during a real-time imaging or after freezing the image. Also, the medical digital ultrasonic imaging apparatus according to the present invention performs various types of focusing methods using the stored data, or signal analysis of the stored data to control the entire system according to the analysis result so that an optimal ultrasonic image can be implemented. As a result, an ultrasonic image having a remarkably enhanced resolution, signal-to-noise ratio, etc. can be obtained.

What is claimed is:

1. A storing method for storing RF ultrasound pulse echoes received from a plurality of transducer elements in a digital ultrasonic imaging system, the storing method comprising the steps of:

(a) sampling the RF ultrasound pulse echoes; and (b) storing sampled data of the RF ultrasound pulse echoes corresponding to each scan line for implementing an ultrasonic image of at least one frame.

2. The storing method of claim 1, wherein said step (a) comprises the pre-step of separating each RF ultrasound pulse echo into an inphase component and a quadrature component.

3. A medical digital ultrasonic imaging apparatus for focusing each RF signal received from a plurality of transducer elements to implement an ultrasonic image, the medical digital ultrasonic imaging apparatus comprising:

a receiver for converting each RF signal into a respective electrical signal;

a beamforming unit for sampling the electrical signal output from the receiver, storing the sampled data corresponding to each scan line for implementing an ultrasonic image of at least one frame respectively, focusing the sampled data or the stored sampled data and outputting the focused result;

a signal processor for receiving the focused signal from the beamforming unit and performing a signal processing for implementing the ultrasonic image; and a controller for controlling the entire apparatus.

4. The medical digital ultrasonic imaging apparatus of claim 3, wherein said beamforming unit can perform at least one of a dynamic focusing and a multiple beam focusing, using the stored sampled data.

5. The medical digital ultrasonic imaging apparatus of claim 3, wherein said beamforming unit performs a focusing in order to implement a zoomed image with respect to a part of the ultrasonic image, using the stored sampled data.

6. The medical digital ultrasonic imaging apparatus of claim 3, wherein said beamforming unit analyzes the stored sampled data and estimates signal characteristics etc. for implementing an ultrasonic image, and then focusing the sampled data or the stored sampled data according to the analyzed result.

7. The medical digital ultrasonic imaging apparatus of claim 3, wherein said beamforming unit comprises:

a plurality of A/D converters for sampling the RF ultrasound pulse echoes and outputting the sampled result;

a plurality of memories corresponding to each of said plurality of A/D converters, and storing the sampled data for implementing an ultrasonic image of at least one frame;

a beamformer for focusing and outputting the applied data;

a plurality of memory controllers corresponding to each said plurality of A/D converters and each said plurality of memories, each of the plurality of memory controllers being capable of transmitting the sampled data received from each of the plurality of A/D converters to each of the corresponding memories of the beamformer, and controlling an input/output of the sample data stored in each of the plurality of memories; and a local processor for controlling the plurality of memory controllers of the beamformer, receiving the sampled data stored in each of the plurality of memories, analyzing the received sampled data, and controlling the beamformer according to the analyses result.

8. The medical digital ultrasonic imaging apparatus of claim 7, wherein, in the case that each transducer element corresponds to each one of the A/D converters, each of the A/D converters performs a uniform sampling at the same instance of time, the beamformer focuses sampled data according to the delay-sum method, a capacity of the memory is expressed as the following equation:

$$\text{Memory capacity} = N_{fr} * N_{sl} * (F_s * 2 * Z_{max}/c)$$

in which $N_{fr}$ is the number of frames to be stored in memory, $N_{sl}$ is the number of scon lines to be stored in every frame, $F_s$ is an A/D conversion rate or a sampling frequency, $Z_{max}$ is a maximum image depth, and C is any ultrasonic velocity in any object.

9. The medical digital ultrasonic imaging apparatus of claim 3, wherein said controller can perform a mutual data transmission with a local processor.

10. The medical digital ultrasonic imaging apparatus of claim 9, wherein said controller receives the analyzed result from the local processor and controls the other components according to the analyzed result.

11. The medical digital ultrasonic imaging apparatus of claim 9, wherein said controller receives the stored sampled data from the local processor and analyzes the received sampled data and controls the other components according to the analyzed result.

12. The medical digital ultrasonic imaging apparatus of claim 11, wherein said controller analyzes signal characteristics for implementing an ultrasonic image with respect to the received stored sampled data.

13. The medical digital ultrasonic imaging apparatus of claim 12, wherein said controller transmits the analyzed result to the local processor.

14. The medical digital ultrasonic imaging apparatus of claim 13, wherein said local processor controls said beamformer according to the received analyzed result.

15. The medical digital ultrasonic imaging apparatus of claim 7, wherein said plurality of memory controllers receive the data from the local processor and transmit the received data to said plurality of memories or said beamformer.

16. The medical digital ultrasonic imaging apparatus of claim 15, wherein said local processor transmits self-generated data or the data received from said controller, to said plurality of memory controllers.

17. The medical digital ultrasonic imaging apparatus of claim 7, wherein said plurality of memory controllers read the sampled data stored in the corresponding memory and transmit the read data to the local processor.

18. The medical digital ultrasonic imaging apparatus of claim 7, wherein said local processor can be connected to each of said plurality of memory controllers one by one.

19. The medical digital ultrasonic imaging apparatus of claim 7, wherein said beamformer and said local processor can be replaced by a single processor which performs both the functions of the beamformer and the local processor.

20. The medical digital ultrasonic imaging apparatus of claim 8, wherein said beamforming unit further comprises:

a plurality of quadrature demodulators for separating each RF ultrasound pulse echo received from a plurality of transducer elements into an inphase component and a quadrature component and outputting the separated result; and a plurality of A/D converters corresponding each of said quadrature demodulators, and including a set of first A/D converters for sampling an in-phase component from each of the quadrature demodulators and second A/D converters for sampling a quadrature component therefrom, for outputting the sampled data to each of said corresponding memory controllers.

* * * * *